US011420315B2

(12) United States Patent
Kneer et al.

(10) Patent No.: US 11,420,315 B2
(45) Date of Patent: Aug. 23, 2022

(54) HANDHELD MACHINE TOOL

(71) Applicant: Robert Bosch GmbH, Stuttgart (DE)

(72) Inventors: Florian Kneer, Duernau (DE); Wolf Zahn, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 1098 days.

(21) Appl. No.: 16/065,585

(22) PCT Filed: Dec. 8, 2016

(86) PCT No.: PCT/EP2016/080272
§ 371 (c)(1),
(2) Date: Aug. 10, 2018

(87) PCT Pub. No.: WO2017/108433
PCT Pub. Date: Jun. 29, 2017

(65) Prior Publication Data
US 2021/0162575 A1  Jun. 3, 2021

(30) Foreign Application Priority Data

Dec. 22, 2015  (DE) .................... 10 2015 226 406.8
Feb. 5, 2016   (DE) .................... 10 2016 201 802.7

(51) Int. Cl.
*B25F 5/00*    (2006.01)
*B25D 17/04*   (2006.01)
(Continued)

(52) U.S. Cl.
CPC ........... *B25D 17/043* (2013.01); *B25D 17/24* (2013.01); *B25F 5/00* (2013.01); *B25F 5/006* (2013.01);
(Continued)

(58) Field of Classification Search
CPC ...................................................... B25F 5/006
See application file for complete search history.

(56) References Cited

U.S. PATENT DOCUMENTS 5,018,983 A * 5/1991 Bittel ..................... H01R 31/06
                                                      439/76.1
5,208,525 A * 5/1993 Lopic ....................... B25F 5/02
                                                       320/112
(Continued)

FOREIGN PATENT DOCUMENTS

CN    201478358 U    5/2010
CN    104139381 A    11/2014
(Continued)

OTHER PUBLICATIONS

International Search Reported dated Feb. 22, 2017, issued in International Application No. PCT/EP2016/080272.

*Primary Examiner* — Nathaniel C Chukwurah
*Assistant Examiner* — Lucas E. A. Palmer
(74) *Attorney, Agent, or Firm* — Norton Rose Fulbright US LLP; Gerard Messina (57) ABSTRACT

A handheld machine tool, which has a housing including a handle, a drive motor situated inside the housing, and an interface for establishing a mechanical and/or an electrical connection between the handheld machine tool and a battery pack, the interface having a base element for the electrical and/or mechanical connection of the interface to the handheld machine tool, and a separate contact carrier including at least one contact element for the electrical and/or mechanical contacting with at least one corresponding mating contact element on the battery pack.

15 Claims, 5 Drawing Sheets

(51) Int. Cl.
  *B25D 17/24* (2006.01)
  *H01R 9/18* (2006.01)
  *H01R 11/12* (2006.01)
  *B25F 5/02* (2006.01)
  *H01M 50/213* (2021.01)
  *H01M 50/247* (2021.01)

(52) U.S. Cl.
  CPC ............. *B25F 5/02* (2013.01); *H01M 50/213* (2021.01); *H01M 50/247* (2021.01); *H01R 9/18* (2013.01); *H01R 11/12* (2013.01); *H01M 2220/30* (2013.01)

(56) References Cited

U.S. PATENT DOCUMENTS

| | | | | |
|---|---|---|---|---|
| 5,553,675 | A * | 9/1996 | Pitzen | H02K 7/116 173/217 |
| 6,057,608 | A * | 5/2000 | Bailey, Jr. | B25F 5/02 307/64 |
| 7,285,019 | B2 * | 10/2007 | Sakai | H01R 12/58 439/620.09 |
| 2005/0082920 | A1 * | 4/2005 | Heigl | B25F 5/02 173/217 |
| 2007/0264869 | A1 * | 11/2007 | Habele | H02K 11/28 439/529 |
| 2008/0135272 | A1 * | 6/2008 | Wallgren | B25F 5/00 173/217 |
| 2011/0003504 | A1 * | 1/2011 | Rejman | B25F 5/02 403/291 |
| 2014/0151079 | A1 * | 6/2014 | Furui | H02J 7/00 173/171 |
| 2015/0151423 | A1 | 6/2015 | Hilti | |
| 2015/0214520 | A1 * | 7/2015 | Nishikawa | H01M 50/20 429/100 |
| 2018/0311807 | A1 * | 11/2018 | Sergyeyenko | H02J 7/00 |
| 2018/0370014 | A1 * | 12/2018 | Roehm | B25F 5/02 |
| 2019/0070720 | A1 * | 3/2019 | Rabe | B25F 5/00 |
| 2020/0146520 | A1 * | 5/2020 | Caspar | A47L 9/2805 |
| 2020/0215679 | A1 * | 7/2020 | Tamura | B25F 5/006 |
| 2021/0043893 | A1 * | 2/2021 | Huggins | H01M 10/4207 |

FOREIGN PATENT DOCUMENTS

| | | |
|---|---|---|
| EP | 2240303 A1 | 10/2010 |
| EP | 2602065 A2 | 6/2013 |
| WO | 2014/027439 A2 | 2/2014 |
| WO | WO-2017145641 A1 * | 8/2017 ................ B25F 5/00 |

* cited by examiner

Fig. 7

HANDHELD MACHINE TOOL

FIELD OF THE INVENTION

The present invention relates to a handheld machine tool.

BACKGROUND INFORMATION

Electrical handheld machine tools are believed to be understood in principle and are supplied with current via a mains connection. As an alternative, cordless power devices provide high flexibility during work, especially because they are independent of a line current. For example, this allows outside work to be carried out in a convenient manner so that the use of battery packs is often provided when operating a hand-held machine tool.

Such battery packs are believed to be understood and may include a plurality of rechargeable accumulators connected in a parallel or series connection, e.g., three cylindrical Li-ion cells connected in series, each featuring 3.6V, with a total voltage of 10.8V. Within the framework of this application, a battery pack should thus be understood as an accumulator packet, which may be made up of a plurality of electrically interconnected battery cells, with the capability of storing electrical energy and supplying the energy required for operating a handheld machine tool, and of being installed in an exchangeable manner in a chamber, in an interface or the like, of the handheld machine tool.

The allocation of the battery pack to the handheld machine tool is accomplished by plugging or inserting the battery pack into a complementary plug socket of the device housing, the battery pack having an interface which is able to be coupled with a complementary mating interface of the handheld machine tool such that the handheld machine tool is electrically coupled with the battery pack and mechanically locked during the coupling. In most cases, the electrical contacting is accomplished via contact elements in the area of the locking device. To couple the two interfaces of the handheld machine tool and the battery pack, the latter is usually equipped with a projecting snap-in device, which is inserted into a complementary plug socket of the former and locks into place therein.

Thus, an interface is to be understood as a device that is provided to directly or indirectly establish an electrical and mechanical connection between a handheld machine tool and a battery pack and/or between a charging device and a battery pack. Both the battery packs and the handheld machine tools as well as the charging devices, and thus the respective interfaces, are subject to a continual further development. The contact elements of the handheld machine tool are normally components that are subject to wear. In the case of heavily vibrating or otherwise highly stressed handheld machine tools, mechanical wear may arise or wear due to spark erosion, which may even result in the failure of the handheld machine tool despite the other function elements still being operable. Although the contact elements and mating contact elements of the interfaces are able to be exchanged in specialized facilities, this has the disadvantage that the exchange usually requires the device to be mailed in by the operator. An exchange by the user is normally not supported because it cannot be ensured, among other things, that all safety-relevant parts are correctly installed again during the subsequent assembly.

SUMMARY OF THE INVENTION

It is an object of the present invention to improve the aforementioned disadvantages and to provide a handheld machine tool of the type mentioned in the introduction, whose interface is configured in such a way that damaged and/or no longer functioning contact elements of an interface are able to be uninstalled and exchanged with minimum effort, with the installation and/or exchange process being as simple and cost-effective as possible and, in particular, able to be carried out by a user himself.

This objective is achieved by a handheld machine tool according to the description herein. Advantageous embodiments, variants and further refinements of the present invention are able to be gathered from the further descriptions herein.

According to the present invention, a handheld machine tool is described which includes a housing provided with a handle, a drive motor disposed in the housing, and an interface for establishing a mechanical and/or an electrical connection between the handheld machine tool and a battery pack. According to the present invention, it is provided that the interface includes a base element for the electrical and/or mechanical connection of the interface to the handheld machine tool, and a separate contact carrier having at least one contact element for the electrical and/or mechanical contacting with at least one corresponding mating contact element on the battery pack. The base element is installed within the handheld machine tool and establishes the electrical connection inside the handheld machine tool. The contact carrier, on the other hand, is connected to the base element in such a way that the electrical contact between them is also established. This ensures that the interface has a two-part design, the contact carrier, which has the contact elements, being able to be exchanged by the user himself, which makes it possible to save costs and to extend the service life of the handheld machine tool.

The base element is advantageously fixedly integrated into the housing of the handheld machine tool, and the contact carrier is reversibly disposed on the base element via at least one contact arrangement so that the contact carrier is reversibly mounted on the base element in such a way that a user is able to exchange the contact carrier in one particularly advantageous embodiment. The base element, which is installed in the handheld machine tool and is not meant to be exchanged by the user, establishes the electrical connection within the handheld machine tool. Because there is the possibility of an exchange by the user, even handheld machine tools that are currently using high-quality materials could retroactively be configured from materials that wear more rapidly but are more cost-effective.

The contact arrangement may be configured as an electrical conductor. Alternatively or additionally, the contact arrangement may be configured as a fastening and connection arrangement in the form of a screw or a threaded sleeve. The contact carrier advantageously has at least one recess for the feed-through of the contact arrangement so that the electrical contact between the base element and the contact carrier is produced by the screw connection. Unscrewing the screwed connection makes it possible to remove the contact carrier together with the contact elements and to exchange it for a corresponding replacement part without the need to open the housing of the handheld machine tool itself and/or to connect the contact elements to the control of the handheld machine tool in a separate step. In addition, with the aid of the contact arrangement, e.g., using additional screws or plug contacts, further contacts, especially for a temperature signal or an encoding or for a device communication, may be possible.

According to the present invention, it is furthermore provided that at least one first electrical connection element is integrated into the at least one recess of the contact carrier. In this way, the contact arrangement may be routed directly through the connection elements of the contact carrier and be directly screwed into the mating contact elements on the side of the handheld machine tool. Alternatively or additionally it is conceivable that the interface has at least one second electrical connection element, in particular a cable shoe, for the electrical contacting of the handheld machine tool. In this variant, too, it is possible to screw the contact arrangement through the connection elements and directly into the mating contact elements on the side of the handheld machine tool, so that the base element and the contact carrier are firmly pressed against each other. Accordingly, the base element has at least one opening for accommodating the contact arrangement. In an advantageous manner, a second electrical connection element is integrated into the at least one opening of the base element so that an electrical contacting between the contact elements and the handheld machine tool is already possible by establishing a connection between the base element and the contact carrier via the contact arrangement themselves and the respective integrated connection elements.

The interface may have at least one elastic element, in particular a spring element, which is configured to mount the interface in a slideable and/or in an elastic manner with respect to the handheld machine tool, which is known to be particularly advantageous for vibrating applications. It is especially advantageous in this context if the elastic element is situated between the interface and the handheld machine tool, which may be between the base element and/or the contact carrier and the handheld machine tool, which not only reduces the wear of the at least one contact element on the side of the handheld machine tool and/or a contact element on the side of the battery pack, but also makes it possible to reduce the wear of the contact arrangement or the connection elements.

It is furthermore possible to provide the base component largely in one piece together with the housing of the handheld machine tool, or alternatively, to fixedly integrate the base element into the housing of the handheld machine tool. In this way, all connection elements on the side of the handheld machine tool are able to be firmly or permanently connected to the base element already during the production of the handheld machine tool, so that there is no longer any need to implement fundamental electronic contactings when exchanging the contact carrier.

The handheld machine tool according to the present invention may also be provided in a tool system. Accordingly, a handheld machine tool together with a battery pack also constitutes a further subject matter of the present invention, the battery pack having at least one corresponding mating contact element for the electrical and/or mechanical connection to the interface of the handheld machine tool.

Considered to be handheld machine tools are generally all handheld machine tools that have a tool holder which, for instance, is able to be set into rotations and/or oscillations and is drivable by a drive motor, e.g., rod-type screwdrivers, rechargeable drills, percussion-drill machines, multi-function tools and/or screw drills. In this context, the transmission of electrical energy in particular describes that the handheld machine tool is supplied with energy via a battery pack and/or via an electrical cable link.

As a matter of principle, different types of accumulators using different materials such as lithium-ions (Li-ion), nickel cadmium (NiCd), nickel metal hydride (NiMH) or lithium polymer (LiPo) may be used as battery cells for a battery pack, as well as different designs such as round, prismatic or angular, or other alternative systems, such as fuel cells. Especially lithium-ion cells may be used since lithium-ion cells, in particular, allow for a combination of multiple battery cells to battery-cell blocks in which multiple battery cells are connected in a parallel circuit. It is particularly advantageous in this context that the cell holder is able to accommodate battery cells having different diameters and lengths, which makes it possible to use the cell holder or cell carrier in different battery packs.

An electromotor is quite generally to be understood as any type of electrical consumer such as an EC motor, a linear drive, a lamp, a pump, a fan, a compressor or the like. Among others, the advantage of brushless EC motors is that they require virtually no maintenance and also allow for a longer working period per battery charge because of their high efficiency during a battery-powered operation, which makes them particularly efficient. In addition, handheld machine tools equipped with EC motors are able to have a very compact and simple design; it is also particularly advantageous that less heat loss is produced, so that the devices do not become as hot as comparable devices, which therefore results in a longer service life.

Additional features, application possibilities, advantages and developments of the present invention result from the following description of the exemplary embodiments that are illustrated in the figures. The description, the associated figures and the claims include numerous features in combination. One skilled in the art will consider these features, and in particular also the features of different exemplary embodiments, both in isolation and combine them to further meaningful combinations. It should be noted in this context that the illustrated features have only a descriptive character and may also be used in combination with features of other further developments described in the previous text, and are not meant to restrict the present invention in any shape or form.

In the following text the present invention will be described in greater detail on the basis of exemplary embodiments.

DETAILED DESCRIPTION

Figure 1:
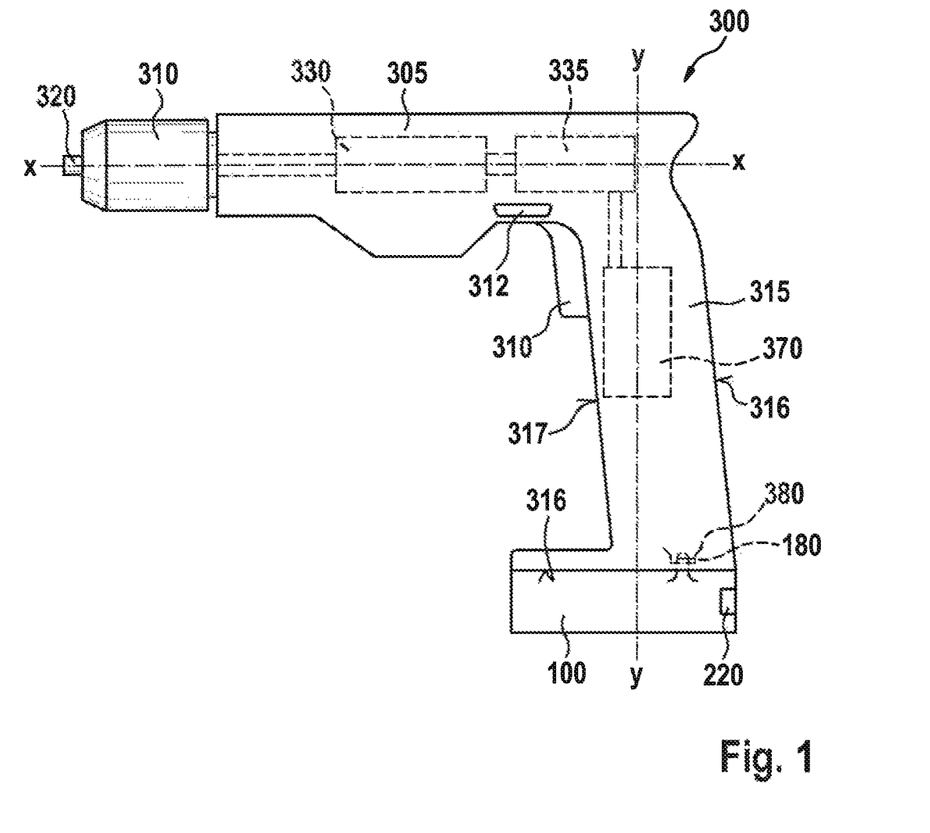
FIG. 1 shows, exemplarily, a view of a handheld machine tool according to the present invention, together with a battery pack.

FIG. 1 shows an electrical device configured as a handheld machine tool 300, which is configured as a battery-powered combo-drill by way of example. In the illustrated embodiment, handheld machine tool 300 is therefore mechanically and electrically connected to a battery pack 100 for a cordless current supply. However, it is pointed out that the present invention is not restricted to battery-powered combo-drills but may instead be used in different handheld machine tools 300, regardless of whether they are operated with the aid of a battery pack 100 as a cordless power supply, as illustrated, or use a mains power supply. Handheld machine tool 300 has a gear unit 330, disposed in a housing 305, for transmitting a torque generated by a drive motor 335 to a drive shaft that rotates about an axis of rotation x and on which a tool holder 320 for a tool (not shown) is fixed in place, and a handle 315. An electzpronics system 370, which is in electronic and/or mechanical contact with drive motor 335 and/or gear unit 330, is situated inside housing 305. Handle 315 is used as a resting surface for a hand of an operator of handheld machine tool 300 and usually has a longitudinal axis y, a front side 317, which points along an axis x in the direction of tool holder 320, a rear side 316, and two side surfaces 318.

A first control element 310 for the energy supply of drive motor 335 is disposed in the region of handle 315, the first control element 310 projecting from housing 305 in a manner that allows manual access for the user, so that—in a manner known per sé—a pressure motion of first control element 310 makes it possible to control and/or regulate the drive motor, which may be as a function of the adjustment travel of first control element 310, thereby switching the voltage supply for drive motor 335 on and/or off. In addition, handheld machine tool 300 has a second control element 312 in the form of a slide switch for adjusting the direction of rotation of drive motor 335 of handheld machine tool 300. Second control element 312 is disposed in a slideable manner perpendicular to axis of rotation x of the drive shaft, in particular tool holder 320 of handheld machine tool 300, so that, when actuated, second control element 312 is able to be moved back and forth between a first position, a second position, and a third position. The first and the second positions establish a respective direction of rotation of the drive motor. As a result, the positions of second control element 312 already allow the user of handheld machine tool 300 to recognize the work mode in which handheld machine tool 300 is operating. In addition, the second control element has a third position between the first position and the second position, e.g., a center position, in which an electrical, electromechanical and/or mechanical interruption of the motor current takes place. For example, the actuation of first control element 310 is able to be mechanically blocked, the second control element 312 having a locking effect on first control element 310 when moved to a third position. As illustrated, second control element 312 is able to be configured as a slide switch or as a rocker switch.

First and second control elements 310, 312 are disposed along axis of rotation x in such a way that both the first and second control elements 310, 312 are able to be operated using the index or middle finger. The distance between first control element 310 and second control element 312 is selected in such a way that it is possible to operate handheld machine tool 300 using one hand. Both control elements 310, 312 are furthermore disposed in a region underneath axis of rotation x and project from housing 305.

In the position shown in FIG. 1, battery pack 100 is attached to handle 315 of handheld machine tool 300 and locked with the aid of a locking arrangement. The placement of battery pack 100 underneath handle 315 does not interfere with the operation of handheld machine tool 300. The locking arrangement, which are not shown in detail, include a locking element and an actuating element 220, among other things. Battery pack 100 is able to be detached from handle 315 of handheld machine tool 300 by operating actuating arrangement 220. In addition, handheld machine tool 300 has an interface 380. Battery pack 100 shown in FIG. 1 is configured as a sliding battery pack, for example, and has an interface 180 that corresponds to interface 380 of handheld machine tool 300. Another embodiment is a battery pack 100, which is mounted so as to be pivotable about the pivot axis; battery pack 100 is able to be reversibly locked on housing 305 of handheld machine tool 300 on the side of battery pack 100 lying opposite the pivot axis, the locking being accomplished by snapping into place, screwing, clamping or bracing. This makes it possible to effectively prevent the battery pack from possibly detaching from the housing.

When fixing illustrated sliding battery pack 100 in place on handheld machine tool 300, receiving arrangement provided on handheld machine tool 300, e.g., guide grooves and guide fins, are brought into engagement with corresponding guide elements 110 of battery pack 100. Battery pack 100 is inserted in a sliding direction along the receiving arrangement of handle 315 and slipped into the battery-pack receptacle of a handheld machine tool 300 along a lower external surface of handle 315 which is essentially aligned perpendicular to axis of rotation x of handheld machine tool 300. However, a configuration as a rotating or pivoting battery pack as an alternative to the sliding battery pack may also be provided.

Figure 2:
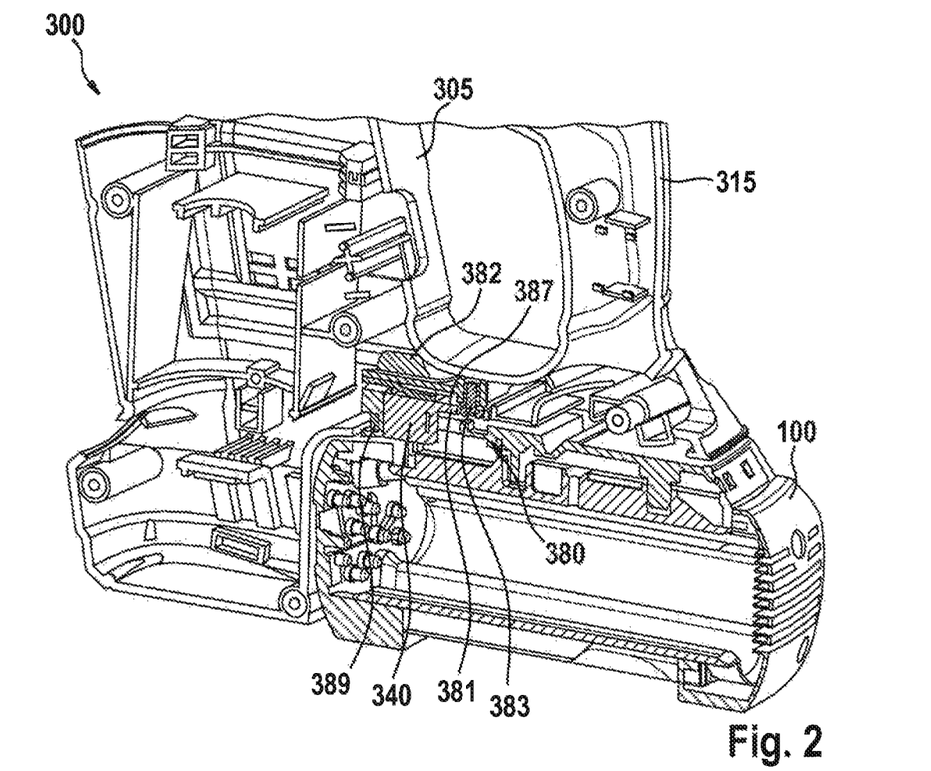
FIG. 2 shows a perspective detail view of an interface between the handheld machine tool and an inserted battery pack from FIG. 1.
Figure 3:
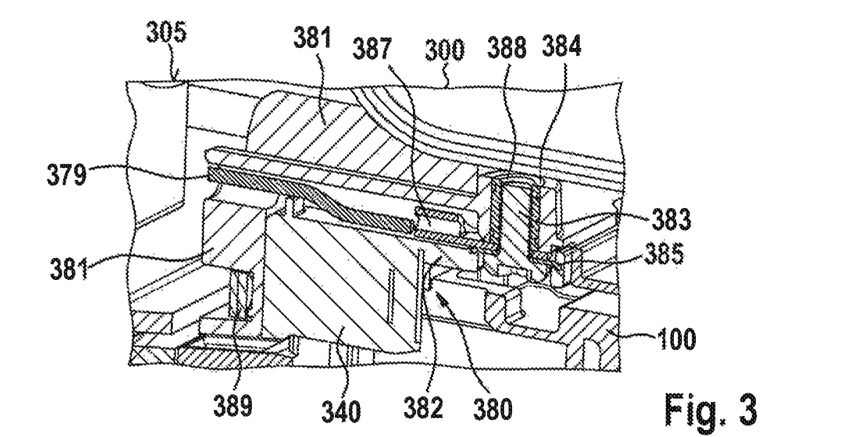
FIG. 3 shows a detail view of the interface from FIG. 2.

As shown in detail in FIGS. 2 and 3, interface 180 of battery pack 100 is slipped into interface 380 of handheld machine tool 300 or into a corresponding interface (not shown) of a charging device. During the sliding process, contact elements 340 on the side of the handheld machine tool reach into a contact gap (not shown in detail) on the side of the battery pack, in which the battery-pack-side contact elements are disposed. Elastic element 389 is tensioned in such a displacement of contact arrangement 340 so that contact arrangement 340 are pressed into the mating contact elements of battery pack 100 by the force exerted by elastic element 389. Via the contact gaps on the side of the battery pack, battery-pack interface 180 and contact elements 340, disposed therein, of interface 180 on the side of the handheld machine tool, battery pack 100 is able to be allocated to handheld machine tool 300 and/or to the charging device, so that when handheld machine tool 300 is in operation, an electrical connection between battery pack 100 and handheld machine tool 300 is established via contact elements 340 and the mating contact elements.

Figure 4:
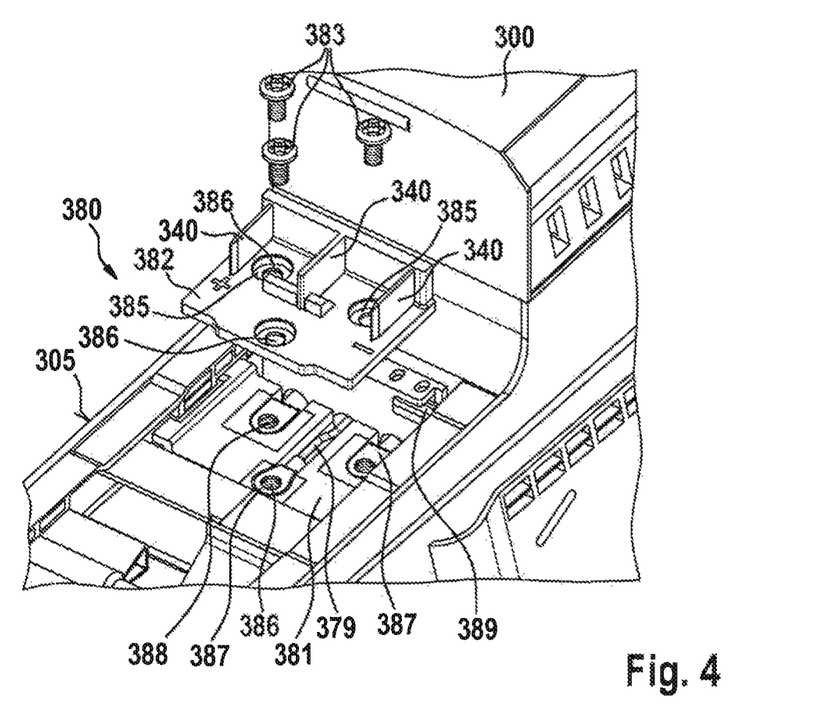
FIG. 4 shows a perspective exploded view of the interface on the side of the handheld machine tool, without an inserted battery pack.
Figure 5:
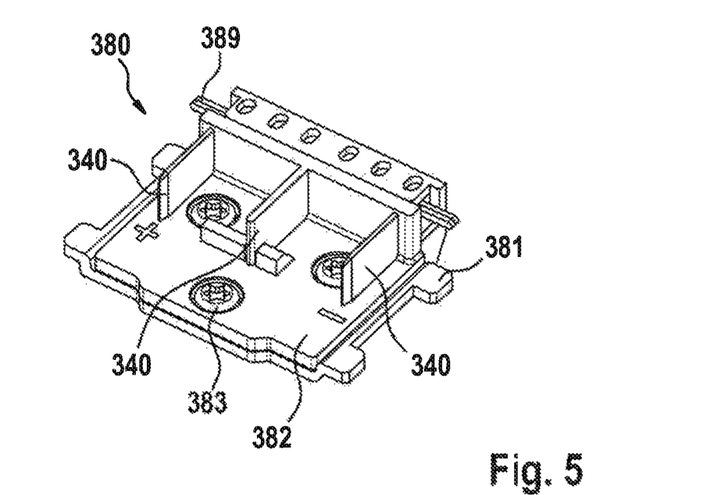
FIG. 5 shows a perspective view of the interface from FIG. 4 on the side of the handheld machine tool.
Figure 6:
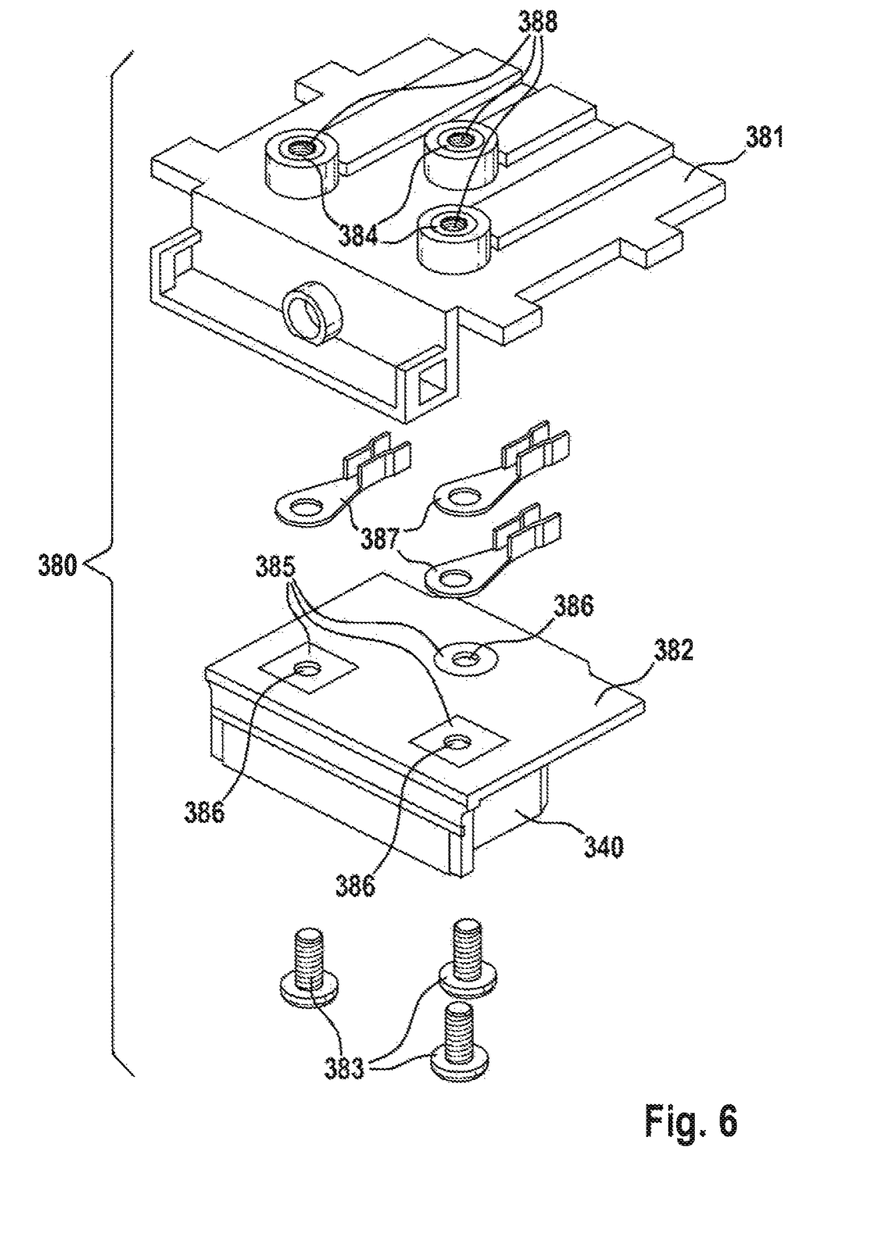
FIG. 6 shows a perspective exploded view of the interface from FIG. 5 on the side of the handheld machine tool, in a plan view.
Figure 7:
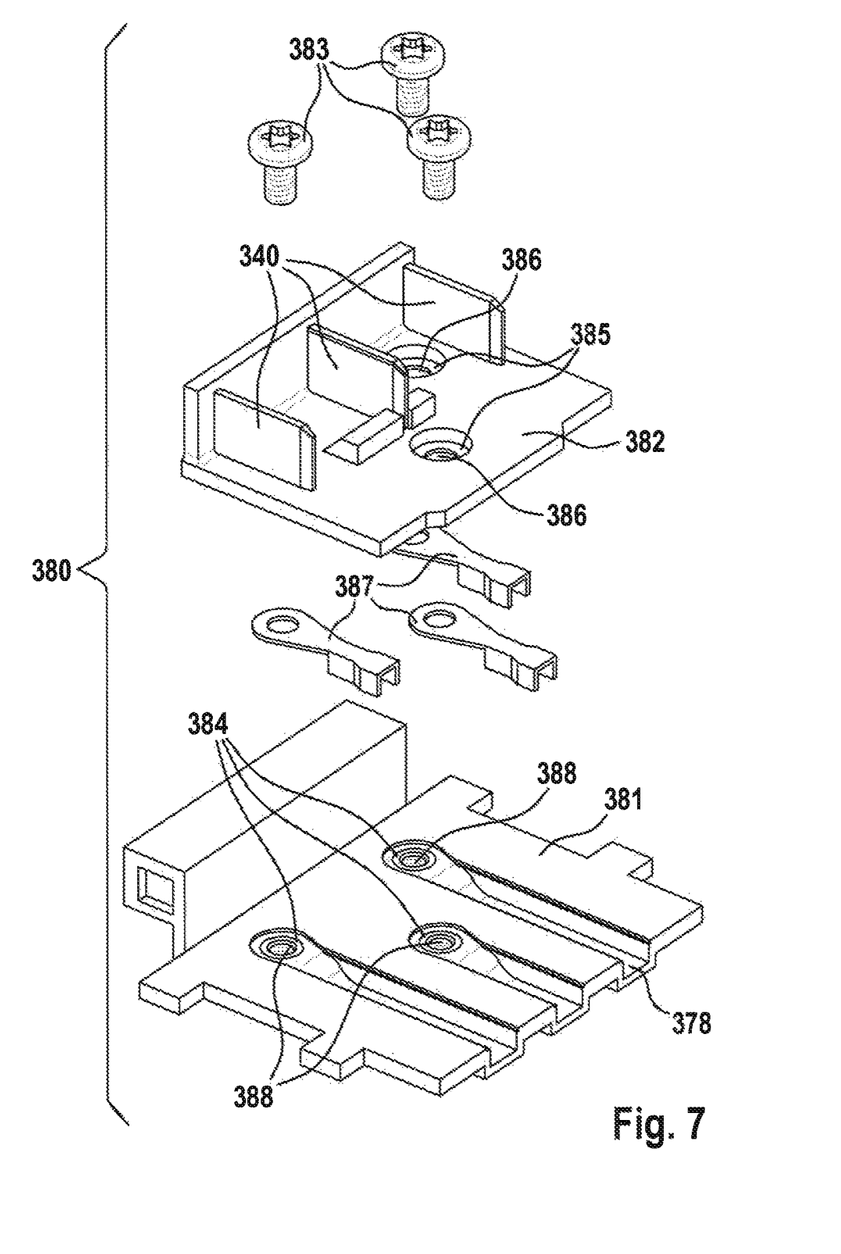
FIG. 7 shows a perspective exploded view of the interface from FIGS. 5 and 6 on the side of the handheld machine tool, viewed from below.

FIGS. 2 and 3 show a perspective view from below of interface 380 on the side of the handheld machine tool, with an installed battery pack 100, whereas FIG. 4 shows a view from below of a handheld machine tool 300 without an inserted battery pack 100. FIGS. 5, 6 and 7 show a perspective view of interface 380 on the side of the handheld machine tool in each case. FIG. 5 shows a view from below of an assembled interface 380, and FIGS. 6 and 7 show an exploded view of interface 380. In the illustrated embodiment variant, base element 381 is firmly integrated into housing 305 of handheld machine tool 300. Contact carrier 382 has three contact elements 340 and is fastened to base element 381 in a detachable manner with the aid of contact arrangement 383. Contact arrangement 383 reach through a recess 386 in contact carrier 382 in order to fix contact carrier 382 in place. Contact elements 340 disposed on contact carrier 382 are connected to a first electrical connection element 385 in each case, a respective connection element 385 being integrated into a respective recess 386 of contact carrier 382.

Base element 381, too, has at least one opening 388, the number of openings 388 advantageously corresponding to the number of recesses 386 in contact carrier 382; a second electrical connection element 384 is integrated into each opening 388, so that an electrical connection between contact carrier 382 and base element 381 is able to be established with the aid of contact arrangement 383. In the illustrated exemplary embodiment, interface 380 furthermore has three second connection elements 387 in the form of cable shoes 387, which are disposed in contact carrier 382 in a manner that corresponds to openings 388 in base element 381 and recesses 386, and which are used for the electrical contacting between interface 380 and electronics system 370 of handheld machine tool 300. The electrical contacting between base element 381 and electronics system 370 of handheld machine tool 300 may be implemented both with the aid of mentioned cable shoes 387, in a detachable and also a permanent manner, e.g., by soldering connection cables 379 or connection elements 387 directly to base element 381. In the case of a detachable connection, cable shoes 387 are clamped between base element 381 and contact carrier 382 with the aid of contact arrangement 389, base element 381 having recesses 378 for the accommodation of cable shoes 387 and/or connection cables 379.

Additionally or alternatively, both the openings 388 in base element 381 and recesses 386 in contact carrier 382 may be directly configured as connection elements 384, 385, in which case additional connection elements 387 are able to be omitted. In order to allow for a secure accommodation of contact arrangement 383, openings 388 in base element 381 as well as recesses 386 in contact carrier 382 may be provided with threaded inserts, it being possible to configure the threaded inserts themselves as electrical conductors. In an advantageous manner, contact arrangement 383 are directly configured as electrical conductors, especially as electrically conductive screws. As a result, contact elements 340 are connected to the handheld machine tool in an electrically conductive manner via the electrically conductive first connection elements 385 integrated into recesses 386 of contact carrier 382, via second electrical connection elements 384 integrated into openings 388 of base element 381, cable shoes 387, and the electrically conductive contact arrangement 383.

With the aid of described interface 380 of a handheld machine tool 300, a user is able—without having to rely on an expert—to remove contact carrier 382, e.g., in the case of a defect in contact elements 340, by detaching contact arrangement 383 from base element 381 and exchanging them for a replacement contact carrier, without having to open housing 305 of handheld machine tool 300 itself. In principle, base element 381 may largely be configured in one piece with housing 305 of handheld machine tool 300, or it may already be permanently integrated into housing 305 during the manufacture of handheld machine tool 300. This allows for a firm or permanent connection of all connection elements on the side of the handheld machine tool to base element 381 already during the manufacture of handheld machine tool 300, so that fundamental electronic contacts need no longer be implemented during an exchange of contact carrier 382.

As illustrated in FIG. 5, interface 380 has elastic element 389, which is tensioned in a displacement of contact arrangement 340 such that the force exerted by elastic element 389 presses contact arrangement 340 into the mating contact elements of battery pack 100. This makes it possible to exert light pressure on the interface connection inside interface 380, whereby an instability of the connection between contact elements 340 of handheld machine tool 300 and the mating contact element of battery pack 100, e.g., when handheld machine tool 300 is transported or when vibrations occur during the operation of handheld machine tool 300, is able to be reduced. Furthermore, the force exerted by elastic element 389 on battery pack 100 may be utilized in a release of a snap-in connection for ejecting battery pack 100, a development of elastic element 389 as shown in FIG. 5, as a leaf spring or some other type, being conceivable in this context.

In addition to the described and illustrated embodiments, additional embodiments are conceivable, which may include further variants as well as a combinations of features.

What is claimed is:

1. A handheld machine tool, comprising:
   a housing having a handle;
   a drive motor disposed in the housing; and
   an interface for establishing a mechanical and/or an electrical connection of the handheld machine tool to a battery pack;
   wherein the interface has a base element for the electrical and/or mechanical connection of the interface to the handheld machine tool, and a separate contact carrier having at least one contact element for the electrical and/or mechanical contacting with at least one corresponding mating contact element on the battery pack,
   wherein the base element has at least one opening corresponding to at least one recess of the contact carrier,
   wherein at least one first electrical connection element is integrated into the at least one recess of the contact carrier, and
   wherein at least one second electrical connection element is integrated into the at least one opening of the base element.

2. The handheld machine tool of claim 1, wherein the base element is firmly integrated into the housing of the handheld machine tool, and the contact carrier is disposed on the base element in a detachable manner via at least one contact arrangement.

3. The handheld machine tool of claim 1, wherein the contact carrier is detachably disposed on the base element so that the contact carrier is able to be exchanged by a user.

4. The handheld machine tool of claim 1, wherein the contact arrangement is configured as an electrical conductor.

5. The handheld machine tool of claim 1, wherein the contact arrangement is configured as a fastening and connection arrangement in the form of a screw, a screw sleeve, a bayonet closure or a plug connector which is vertically disposed in relation to an insertion direction of a battery pack.

6. The handheld machine tool of claim 1, wherein the contact carrier has at least one recess for the feed-through of the contact arrangement.

7. The handheld machine tool of claim 1, wherein the base element has at least one opening for accommodating the contact arrangement.

8. The handheld machine tool of claim 7, wherein the second electrical connection element is integrated into the at least one opening of the base element.

9. The handheld machine tool of claim 1, wherein the interface has at least one elastic element, which is provided for mounting the interface in a slidable and/or flexible manner in relation to the handheld machine tool.

10. The handheld machine tool of claim 9, wherein the elastic element is disposed between the interface and the handheld machine tool.

11. The handheld machine tool of claim 9, wherein the elastic element is disposed between the base element and/or the contact carrier and the handheld machine tool.

12. The handheld machine tool of claim 1, wherein the base element is configured in one piece with the housing of the handheld machine tool.

13. The handheld machine tool of claim 1, wherein the interface has at least one second electrical connection element, which includes a cable shoe, for the electrical contacting of the handheld machine tool.

14. The handheld machine tool of claim 1, wherein the interface has at least one elastic element, which includes a spring element, which is provided for mounting the interface in a slidable and/or flexible manner in relation to the handheld machine tool.

15. A tool system, comprising:
- a handheld machine tool, including:
  - a housing having a handle;
  - a drive motor disposed in the housing; and
  - an interface for establishing a mechanical and/or an electrical connection of the handheld machine tool to a battery pack;
  - wherein the interface has a base element for the electrical and/or mechanical connection of the interface to the handheld machine tool, and a separate contact carrier having at least one contact element for the electrical and/or mechanical contacting with at least one corresponding mating contact element on the battery pack,
  - wherein the base element has at least one opening corresponding to at least one recess of the contact carrier,
  - wherein at least one first electrical connection element is integrated into the at least one recess of the contact carrier, and
  - wherein at least one second electrical connection element is integrated into the at least one opening of the base element; and
- the battery pack having at least one corresponding mating contact element for the electrical and/or mechanical connection to the interface of the handheld machine tool.

* * * * *